UNITED STATES PATENT OFFICE.

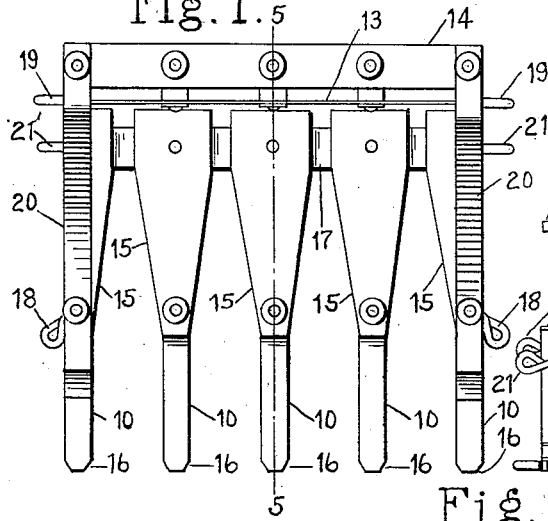
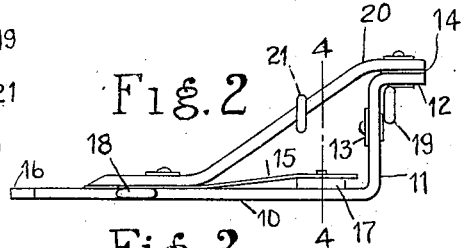
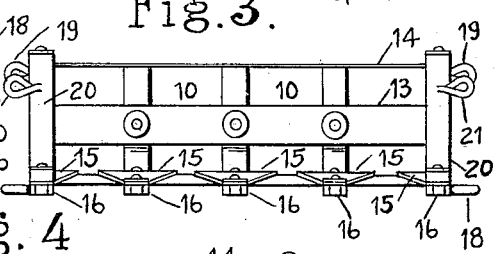
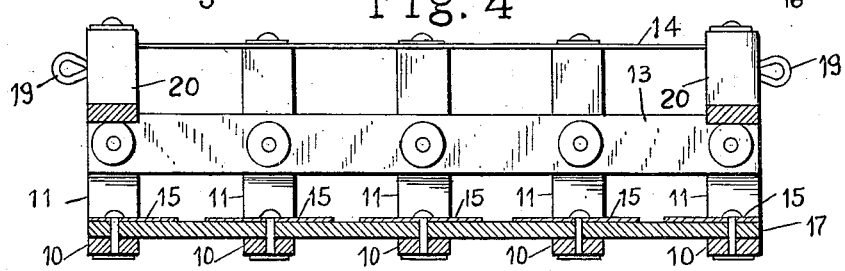
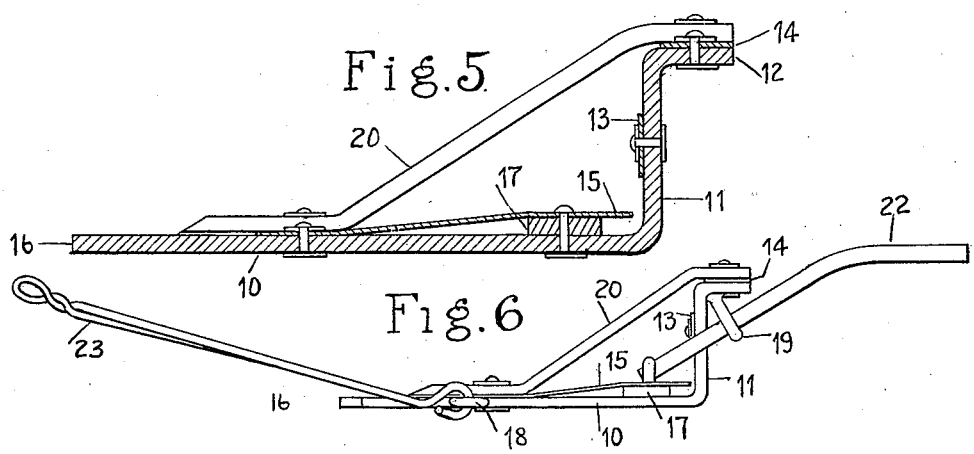

ALBERT VOLLERS, OF GUIDE ROCK, NEBRASKA.

TINED SCRAPER.

1,065,748. Specification of Letters Patent. Patented June 24, 1913.

Application filed December 3, 1912. Serial No. 734,710.

*To all whom it may concern:*

Be it known that I, ALBERT VOLLERS, a citizen of the United States, residing at Guide Rock, in the county of Webster, State of Nebraska, have invented certain new and useful Improvements in Tined Scrapers; and I do hereby declare the following to be a full, clear, and exact description of the invention, such as will enable others skilled in the art to which it appertains to make and use the same.

This invention relates to improvements in scrapers, and has particular reference to a device for gathering hay, or conveying manure or the like.

The principal object of this invention is to provide a simple device of this character which is strong and durable in construction.

Another object is to provide means for preventing the material falling through the tines when the scraper is lifted to convey the material from one place to another.

Other objects and advantages will be apparent from the following description and with particular reference to the accompanying drawings.

In the drawings: Figure 1 is a plan view of a scraper made in accordance with my invention, Fig. 2 is a side elevation, Fig. 3 is a front elevation, Fig. 4 is a vertical transverse sectional view on the line 4—4 of Fig. 2, Fig. 5 is a vertical longitudinal sectional view on the line 5—5 of Fig. 1, Fig. 6 is a side elevation of the application of my invention to a scraper provided with handles.

Referring particularly to the accompanying drawings, 10 represents a number of tines. At the rear end of each of these tines the frame is bent upwardly as at 11, the terminal end being then bent rearwardly at approximately a horizontal plane as indicated at 12. Arranged transversely to these horizontal portions and secured thereto is a transverse bar 13, and secured transversely of the tines and to the upturned portion is a bar or plate 14.

Secured on each of the tines and running longitudinally thereof is a plate 15, said plate being forwardly tapered and secured at its forward end at a suitable distance from the forward pointed end 16 of the tine. The rear end of the plate is secured to a cross bar 17 secured near the inner ends of the tines and extending transversely thereof. The inner end portions of the plates are straight of a width to almost touch each other, and form a solid portion to support the material to be gathered and conveyed. Secured to the outer tines are the loops 18, and to the braces and to the upturned portions of the tines are similar loops 19 for attachment of a bail, with which to pull the scraper. Extending downwardly and forwardly from the rearwardly turned portion of the tines, and secured at their opposite ends respectively to said rearwardly turned portions, and to said forward portions of the tines are the braces 20, each of the braces carrying a loop 21 for a similar purpose to the loops just described.

The device as shown in Fig. 6 has a pair of handles 22, extending rearwardly, which are adapted to be grasped by the operator to guide the scraper as it is pulled by means of the pivoted bail 23, which bail is pivotally carried near the forward end of the outer tines.

The principal points of this invention, and on which the claim is particularly based, are the transverse bracing bar, the inclined bracing bar, the plates secured to the upper faces of the tines, the cross bar and the plates which have their inner ends widened to form a support for preventing material sifting through the bases of the tines when the scoop or scraper is elevated.

What is claimed is:—

A scraper comprising a plurality of tapered tines, the rear portions of the tines being bent upwardly and rearwardly, transverse bars secured to the upwardly extending portions, downwardly and forwardly extending braces secured to the outer tines, a transverse bar secured to the inner ends of the tines, and outwardly tapering plates secured to the upper faces of the tines, the inner end portions of each of the said plates being widened and disposed close together.

In testimony whereof, I affix my signature, in the presence of two witnesses.

ALBERT VOLLERS.

Witnesses:
LLOYD H. HUNTER,
B. WICHMANN.

---

Copies of this patent may be obtained for five cents each, by addressing the "Commissioner of Patents, Washington, D. C."